(12) United States Patent
Herrmann et al.

(10) Patent No.: US 11,015,720 B2
(45) Date of Patent: May 25, 2021

(54) CLOSED-LOOP CONTROL VALVE MODULE

(71) Applicant: Buerkert Werke GmbH & Co. KG, Ingelfingen (DE)

(72) Inventors: Markus Herrmann, Ingelfingen (DE); Daniel Beck, Ingelfingen (DE); Ralf Strasswiemer, Ingelfingen (DE); Michael Stephan, Ingelfingen (DE)

(73) Assignee: BUERKERT WERKE GMBH & CO. KG, Ingelfingen (DE)

( * ) Notice: Subject to any disclaimer, the term of this patent is extended or adjusted under 35 U.S.C. 154(b) by 0 days.

(21) Appl. No.: 16/225,322

(22) Filed: Dec. 19, 2018

(65) Prior Publication Data

US 2019/0195369 A1 Jun. 27, 2019

(30) Foreign Application Priority Data

Dec. 22, 2017 (DE) .................... 10 2017 131 146.7

(51) Int. Cl.
| | |
|---|---|
| *F16K 1/52* | (2006.01) |
| *F16K 31/04* | (2006.01) |
| *F16K 1/38* | (2006.01) |
| *F16K 1/06* | (2006.01) |
| *F16K 39/02* | (2006.01) |
| *F16K 47/08* | (2006.01) |

(52) U.S. Cl.
CPC ............... *F16K 1/52* (2013.01); *F16K 1/06* (2013.01); *F16K 1/38* (2013.01); *F16K 31/043* (2013.01); *F16K 39/022* (2013.01); *F16K 47/08* (2013.01)

(58) Field of Classification Search
CPC . F16K 1/52; F16K 39/022; F16K 1/06; F16K 1/38; F16K 31/043; F16K 17/20; F16K 1/32; F16K 31/04; F16K 47/00; F16K 47/08
USPC ............................ 251/48–54, 129.11–129.13
See application file for complete search history.

(56) References Cited

U.S. PATENT DOCUMENTS

| | | | | |
|---|---|---|---|---|
| 2,985,424 A | * | 5/1961 | Anderson ................. | F16K 1/34 251/332 |
| 4,815,699 A | * | 3/1989 | Mueller .................. | F16K 41/10 251/129.11 |
| 6,003,535 A | * | 12/1999 | Ollivier ................... | F16K 31/04 137/8 |

(Continued)

FOREIGN PATENT DOCUMENTS

| | | |
|---|---|---|
| DE | 2361966 A1 | 6/1975 |
| DE | 7522540 U | 7/1976 |

(Continued)

*Primary Examiner* — John Bastianelli
(74) *Attorney, Agent, or Firm* — Dilworth IP, LLC (57) ABSTRACT

A closed-loop control valve module for closed-loop controlling a fluid flow is described, which comprises an electrical valve actuator motor, wherein a valve spindle comprising a frustoconical sealing section is displaceable by means of the valve actuator motor along a valve spindle axis and the frustoconical sealing section, depending on the position of the valve spindle, releases or separates off a flow channel connecting a fluid inlet and a fluid outlet. A pressure compensation channel is provided which, at least in the closed state of the closed-loop control valve module, connects an end of the valve spindle opposite the valve actuator motor to a pressure compensation area or the fluid inlet in terms of flow.

20 Claims, 4 Drawing Sheets

(56) References Cited

U.S. PATENT DOCUMENTS

| | | | |
|---|---|---|---|
| 6,460,567 B1 * | 10/2002 | Hansen, III | F16K 31/04 137/554 |
| 6,691,980 B2 * | 2/2004 | Larsen | F16K 1/00 251/129.04 |
| 2010/0171056 A1 * | 7/2010 | Hoang | F16K 3/0254 251/129.11 |

FOREIGN PATENT DOCUMENTS

| | | | |
|---|---|---|---|
| DE | 253463 | A1 | 1/1988 |
| EP | 0369090 | A1 | 5/1990 |

\* cited by examiner

CLOSED-LOOP CONTROL VALVE MODULE

FIELD OF THE INVENTION

The invention relates to a closed-loop control valve module for closed-loop controlling a fluid flow.

BACKGROUND

Such valve modules are known from the state of the art and are often operated via an electrical valve actuator motor.

In that case a valve element is displaced by means of the electrical valve actuator motor such that the closed-loop control function is performed. Thus the valve element can adopt not only an open and a closed position, but also usually several intermediate positions. This can involve, for example, the closed-loop control of a pressure or a volume flow.

The object of the invention is to specify a compact and light-weight closed-loop closed-loop control valve module.

SUMMARY OF THE INVENTION

The object is achieved by a closed-loop control valve module of the type named at the beginning which comprises an electrical valve actuator motor, wherein a valve spindle comprising a frustoconical sealing section is displaceable by means of the valve actuator motor along a valve spindle axis, and the frustoconical sealing section, depending on the position of the valve spindle, releases or separates off a flow channel connecting a fluid inlet and a fluid outlet, wherein a pressure compensation channel is provided which, at least in the closed state of the closed-loop control valve module, connects an end of the valve spindle opposite the valve actuator motor to a pressure compensation area or the fluid inlet in terms of flow. If in this context the pressure compensation channel is connected to the pressure compensation area, the latter can also be called an exhaust channel.

The pressure compensation area can be formed by a closed-loop control valve environment, i.e. the space surrounding the closed-loop control valve, or by an interior of a housing of the closed-loop control valve module. The pressure compensation area is preferably an interior space of a valve drive housing.

To convert the rotational actuation movement of the valve actuator motor into a translational displacement movement of the valve spindle along the valve spindle axis, a transmission element is preferably provided via which the valve actuator motor and the valve spindle are coupled. By means of the pressure compensation channel, substantially the same pressure prevails, at least in the closed state of the closed-loop control valve module, at the end of the valve spindle opposite the valve actuator motor as in the pressure compensation area or at the fluid inlet. This pressure acts on surfaces of the valve spindle which are arranged axially relative to the valve spindle axis or at least have an axial surface portion. With respect to their orientation, these surfaces can be divided into two groups, which are oriented in opposite axial directions in each case. The interaction of the pressure with the surfaces consequently produces forces acting in the axial direction on the valve spindle which at least partly cancel each other out. Provided that a pressure-loaded fluid lies against the fluid inlet, no or a comparatively small resulting force coming from the pressure-loaded fluid thus acts on the valve spindle, and thus on the valve actuator motor, because of the pressure compensation channel and the above-named surfaces. This applies in particular compared with a closed-loop control valve module without a pressure compensation channel. Thus the pressure compensation channel has the result that, compared with a closed-loop control valve module without a pressure compensation channel, a lower-power valve actuator motor is sufficient for the functionality of the control valve module if the pressurization level at the fluid inlet remains constant. Thus the closed-loop control valve module also has a much lower energy consumption. In the case where the valve actuator motor, starting from a closed-loop control valve module without a pressure compensation channel, is not changed, the pressure compensation channel makes it possible to use the closed-loop control valve module even in the case of higher pressures at the fluid inlet. Due to the fact that a lower-power valve actuator motor as a rule also has a more compact structure as well as a lower weight, the closed-loop control valve module can thus be constructed smaller and lighter overall with the same pressurization level at the fluid inlet.

Thus the valve actuator motor is preferably designed as a rotational drive. In other words, the valve actuator motor represents a rotary drive.

The closed-loop control valve module can be formed as a so-called proportional valve. Then the flow through the closed-loop control valve module is proportional to a displacement path of the valve spindle along the valve spindle axis. In other words, there is a linear relationship between the flow and the displacement path. This characteristic is decisively dependent on the cross section of the released flow channel delimited by the frustoconical sealing section.

In a preferred embodiment, a fluid flow direction oriented from the fluid inlet to the fluid outlet is oriented, at least in the area of the valve seat, in the same direction as a widening direction of the frustoconical sealing section. The widening direction is contrary to a tapering direction of the frustoconical sealing section. This is referred to as an under seat inflow of the frustoconical sealing section. This is advantageous because it brings with it comparatively small pressure losses between the fluid inlet and the fluid outlet.

In addition, the closed-loop control valve module can be designed such that the sealing section is shifted in the direction of its open position when it is moved away from the valve actuator motor.

Alternatively, the closed-loop control valve module can also be designed such that the sealing section is shifted in the direction of its closed position when it is moved away from the valve actuator motor.

The frustoconical sealing section and the valve seat preferably interact in radially sealing manner. The radial direction is to be understood relative to the valve spindle axis. A reliable seal effect of the closed-loop control valve module thus results. Thus the flow channel can be reliably separated off and guarantees a proportional course of the flow-displacement path characteristic line in the case of small valve openings, i.e. in the case of small displacement paths.

The end of the valve spindle opposite the valve actuator motor, in particular an axial end surface of the valve spindle comprised by this end, can delimit a cavity provided in a closed-loop control valve housing and the pressure compensation channel can connect the cavity to the pressure compensation area or the fluid inlet in terms of flow. Because of the cavity, the valve spindle, at least at one end, does not project out of a closed-loop control valve housing in any of its positions. The other end of the valve spindle can be accommodated in a valve drive housing, which can make possible an air exchange with the closed-loop control valve environment or can completely encapsulate the valve drive. The valve spindle is thereby protected against negative environmental influences. This is also the case when the pressure compensation channel is connected to a closed-loop control valve environment acting as pressure compensation area, as the former has a comparatively small cross section and devices can be provided which prevent foreign particles from entering into the pressure compensation channel, e.g. filters or grids. The closed-loop control valve environment is thus also protected against emergent fluid and/or any lubricant present. A reliably functioning closed-loop control valve module results.

According to a variant, the pressure compensation channel runs in the closed-loop control valve housing. The pressure compensation channel can be incorporated into the closed-loop control valve housing as a bore or within the framework of a casting process. For example the pressure compensation channel can be oriented substantially along the valve spindle axis and open into the closed-loop control valve environment. Alternatively, the pressure compensation channel can be aligned substantially transverse to the valve spindle axis and be connected in terms of flow to the fluid inlet. In both alternatives, the pressure compensation channel can be incorporated comparatively easily into the closed-loop control valve housing and allows a reliable and swift pressure compensation.

Alternatively, the pressure compensation channel runs in the valve spindle. Here also the pressure compensation channel can be incorporated into valve spindles with the usual manufacturing methods that are used to produce them. For example the pressure compensation channel can be manufactured by machining or by forming. In this connection, the valve spindle can be made of metal, ceramic or of plastic. The pressure compensation channel is preferably incorporated during the manufacturing process of the valve spindle. In this respect, there is only a very small additional cost in the manufacture of the valve spindle as a result of the pressure compensation channel.

Advantageously, the pressure compensation channel comprises a pressure compensation channel section running substantially along the valve spindle axis and a pressure compensation channel section running substantially transverse to the valve spindle axis, in particular wherein the pressure compensation channel section running transverse to the valve spindle axis fully traverses the valve spindle. Advantageously, both sections of the pressure compensation channel are designed as bores. With regard to the pressure compensation channel section running transverse to the valve spindle axis, it is thus simpler in manufacturing terms to provide a through-bore than to have to ensure a sufficient depth of a blind hole. In addition, the probability is thus reduced that unwanted cuttings remain in the bore. In addition, the pressure compensation channel thus has two mouths on the closed-loop control valve environment side. Because of this redundance, a pressure compensation is particularly reliably guaranteed. The pressure compensation channel section running along the valve spindle axis serves primarily to conduct the fluid flowing through the pressure compensation channel during the pressure compensation out of a sealing area of the closed-loop control valve.

In a closed state of the closed-loop control valve module, a mouth of the pressure compensation channel on the fluid inlet side can be arranged on a fluid inlet side of the valve seat, in particular wherein the mouth of the pressure compensation channel on the fluid inlet side is arranged adjacent to the sealing section. Because the mouth on the fluid inlet side lies as close as possible to the sealing section, the pressure compensation is improved in respect of two criteria. Firstly, strict tolerances are observed during pressure compensation, as only comparatively short line sections, which falsify the pressure compensation overall as a result of a pressure drop effected by these line sections, lie between the mouth and the valve seat. Secondly, a pressure compensation can thus happen relatively quickly because the flow paths are comparatively short. A swift and reliable pressure compensation results overall.

In a closed state of the closed-loop control valve module, a mouth of the pressure compensation channel on the pressure compensation area side can also be arranged inside a valve drive housing. The mouth on the pressure compensation area side is thus not in direct fluid connection with the closed-loop control valve environment, but is protected via the valve actuator housing. In the case where hermetically sealed valve actuator housings are used, which are to be found for example in explosion-proof applications or in general in applications with high IP protection classes, the mouth on the pressure compensation area side is not in fluid connection with the closed-loop control valve environment at all. Thus dirt and other unwanted foreign particles from the environment of the closed-loop control valve are effectively prevented from entering the pressure compensation channel. The pressure compensation can thus be performed particularly reliably.

Preferably the valve actuator motor can be operated in two directions, in particular wherein the valve spindle is not spring-loaded. In two directions means that the valve actuator motor can actively move the valve spindle both in an opening direction and in a closing direction. Thus the valve spindle can be closed-loop controlled precisely in both directions. Thus a spring, which is usually provided to reset the valve actuator motor in the case of valve actuator motors which are unidirectional only, is not required. With it a source of error inside the closed-loop control valve module is dispensed with, with the result that the latter functions particularly reliably overall.

The valve actuator motor can also be self-locking. In this context, self-locking means that the motor in the deenergized state cannot be moved by a force acting from outside on the valve spindle. Such a force could result for example from the fluid pressure. Thus the valve actuator motor is always in a defined position, as a result of which the closed-loop control quality of the closed-loop control valve module is high.

According to an alternative design, in a closed state of the closed-loop control valve module, all surface areas of the valve spindle oriented in the axial direction which are in fluid connection with the pressure compensation area and point in the direction of the valve actuator motor correspond cumulatively to 75% to 125% of the cumulative surface areas of the valve spindle oriented in the axial direction which are in fluid connection with the pressure compensation area and point in a direction contrary to the valve actuator motor. A so-called suction of the valve spindle, i.e. the generation of a negative pressure at one end of the valve spindle, is thus also prevented. In an idealized consideration, the forces acting in the axial direction on the valve spindle cancel each other out. Then the valve spindle is fully pressure-compensated and can be moved with comparatively small forces. In the case of a movement of the valve spindle only the friction must be overcome. From practical viewpoints, however, full compensation is unlikely, with the result that it is also sufficient if the forces acting axially in opposite directions correspond substantially in terms of size and thus roughly cancel each other out. As a rule, when the axial forces coincide 90% in terms of size, this is referred to as an almost complete compensation.

Alternatively, in a closed state of the closed-loop control valve module, all surface areas of the valve spindle oriented in the axial direction which are in fluid connection with the fluid inlet and point in the direction of the valve actuator motor correspond cumulatively to 75% to 125% of the cumulative surface areas of the valve spindle oriented in the axial direction which are in fluid connection with the fluid inlet and point in a direction contrary to the valve actuator motor. The above-named effects and advantages detailed for a pressure compensation relative to the closed-loop control valve environment apply analogously to a pressure compensation relative to the fluid inlet.

In addition, in a closed state of the closed-loop control valve module, all surface areas of the valve spindle oriented in the axial direction which are in fluid connection with the fluid outlet and point in the direction of the valve actuator motor correspond cumulatively to 75% to 125% of the cumulative surface areas of the valve spindle oriented in the axial direction which are in fluid connection with the fluid outlet and point in a direction contrary to the valve actuator motor. Thus there is a pressure compensation relative to the fluid outlet. This is carried out in particular when a so-called back pressure is expected at the fluid outlet. The pressure compensation on the fluid outlet side can take place solely via the above-named surfaces on the valve spindle and can thus be realized without a pressure compensation channel. In respect of the further effects and advantages, reference is made to the embodiments relating to pressure compensation on the pressure compensation area side and the fluid inlet side.

BRIEF DESCRIPTION OF THE DRAWINGS

The invention is explained below with reference to various embodiment examples which are shown in the attached drawings. There are shown in.

DETAILED DESCRIPTION

Figure 1:
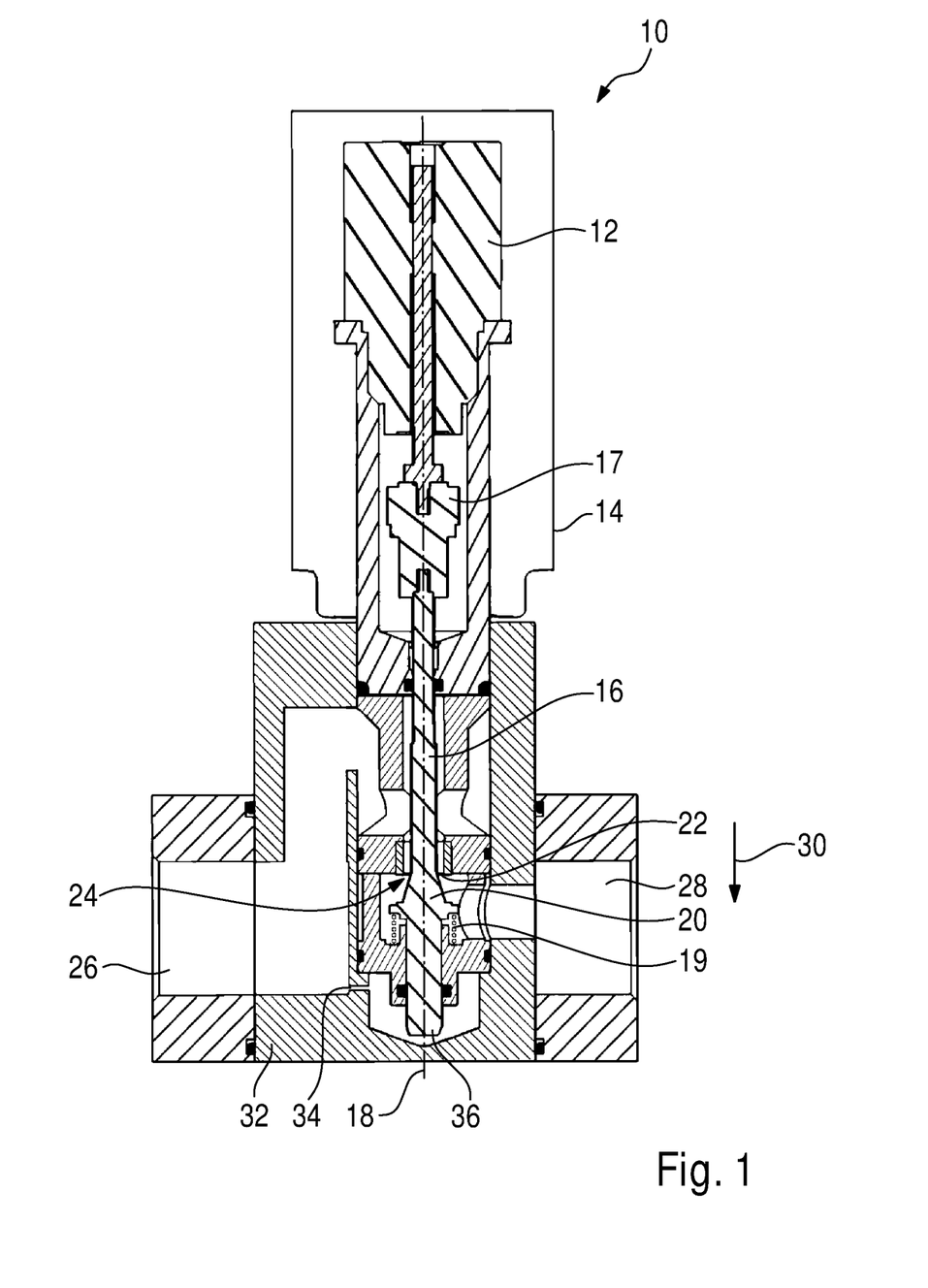
FIG. 1 a closed-loop control valve module according to the invention according to a first embodiment in a sectional representation, FIG. 2 a detail view of FIG. 1, FIG. 3 a view corresponding to FIG. 2 of a closed-loop control valve module according to the invention according to a second embodiment, wherein the closed-loop control valve module is represented in the open state, FIG. 4 the closed-loop control valve module according to the invention from FIG. 3 in a closed state and FIG. 5 a closed-loop control valve module according to the invention according to a third embodiment in a sectional representation.

FIG. 1 shows a closed-loop control valve module 10 for closed-loop controlling a fluid flow not represented in more detail.

For this, the closed-loop control valve module 10 comprises an electrical valve actuator motor 12 which is arranged in a valve actuator housing 14.

A valve spindle 16 can be displaced along a valve spindle axis 18 by means of the valve actuator motor 12.

For this purpose, a transmission element 17 is interposed between the valve actuator motor 12 and the valve spindle 16.

The valve actuator motor 12 can be operated in two directions. Thus it can move the valve spindle 16 in two opposite directions oriented along the valve spindle axis 18.

Strictly speaking, a spring 19 loading the valve spindle 16 is not required in this connection. In the present case, it serves merely to support the valve actuator motor 12 when the latter moves the valve spindle 16 in a direction pointing towards the valve actuator motor 12. The spring 19 could also be omitted.

In addition, the valve actuator motor 12 is self-locking. This means that the valve actuator motor 12 even in the deenergized state cannot be moved by forces acting from outside on the valve spindle 16.

Provided on the valve spindle 16 is a frustoconical sealing section 20 which interacts in a radially sealing manner with a valve seat 22, depending on the position of the valve spindle 16. In this connection, the sealing section 20 can also be denoted closed-loop control cone.

In an open state of the closed-loop control valve module 10, the frustoconical sealing section 20 releases a flow channel 24 which connects a fluid inlet 26 of the closed-loop control valve module 10 to a fluid outlet 28 of the closed-loop control valve module 10.

In a closed state of the closed-loop control valve module 10, the frustoconical sealing section 20 separates off the flow channel 24. Thus the fluid inlet 26 and the fluid outlet 28 are also separated from each other.

The closed-loop control valve module 10 is designed such that the frustoconical sealing section 20 is moved away from the valve actuator motor 12 in the direction of the open state.

In addition, the frustoconical sealing section 20 is arranged such that a fluid flow direction running from the fluid inlet 26 via the flow channel 24 to the fluid outlet 28 in the area of the valve seat 22 is oriented in the same direction as a widening direction 30, which is symbolized by an arrow, of the frustoconical sealing section 20. This is also referred to as an under seat inflow.

The valve seat 22, the flow channel 24 as well as most of the valve spindle 16 are placed in a closed-loop control valve housing 32.

In addition, a pressure compensation channel 34 is provided which connects an end 36 of the valve spindle 16 opposite the valve actuator motor 12 to the fluid inlet 26 in terms of flow.

The pressure compensation channel 34 runs in the closed-loop control valve housing 32.

The end 36 of the valve spindle 16 opposite the valve actuator motor 12, to be precise an axial end surface 38 of the valve spindle 16 comprised by this end 36 (see FIG. 2) delimits a cavity 40 provided in the closed-loop control valve housing 32.

Figure 2:
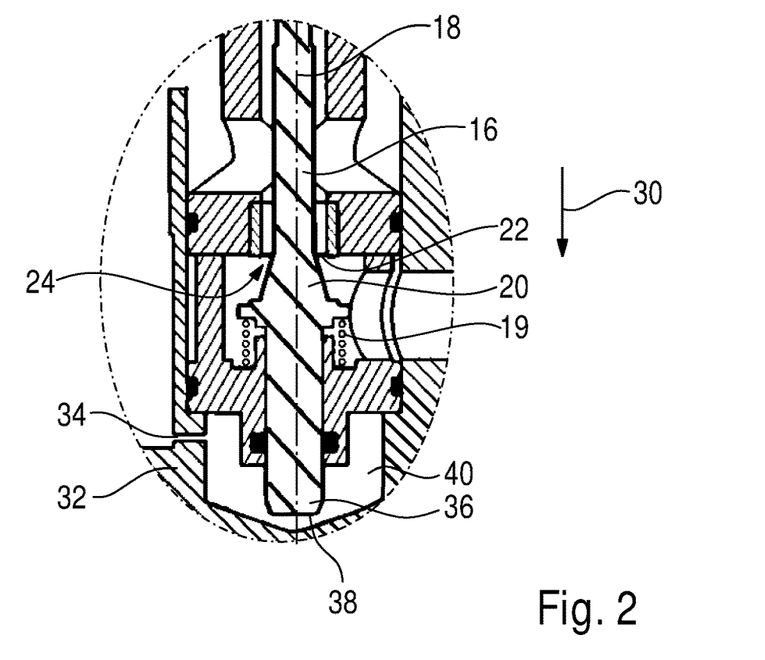

The pressure compensation channel 34 thus connects the fluid inlet 26 to the cavity 40 in terms of flow.

Figure 3:
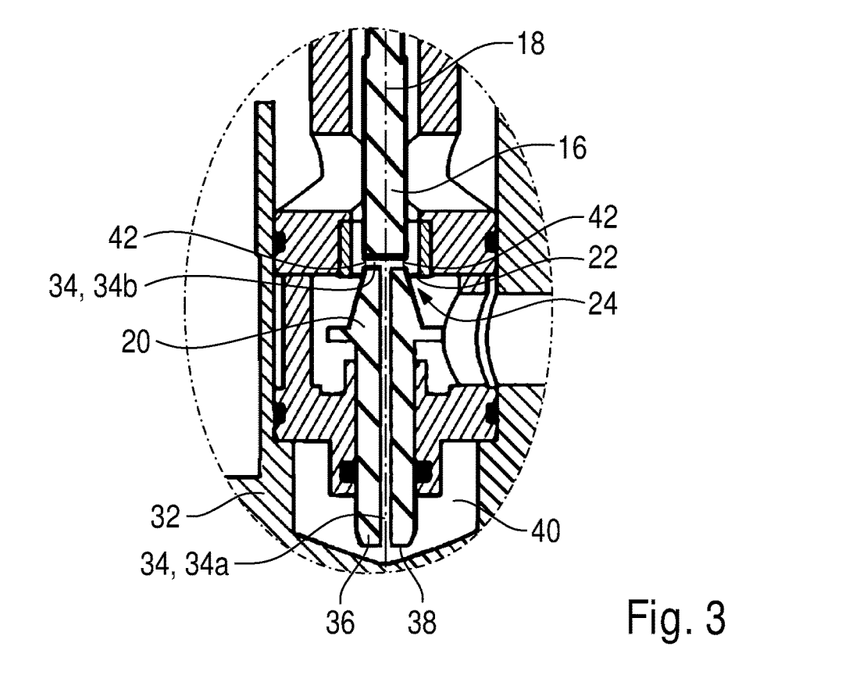
Figure 4:
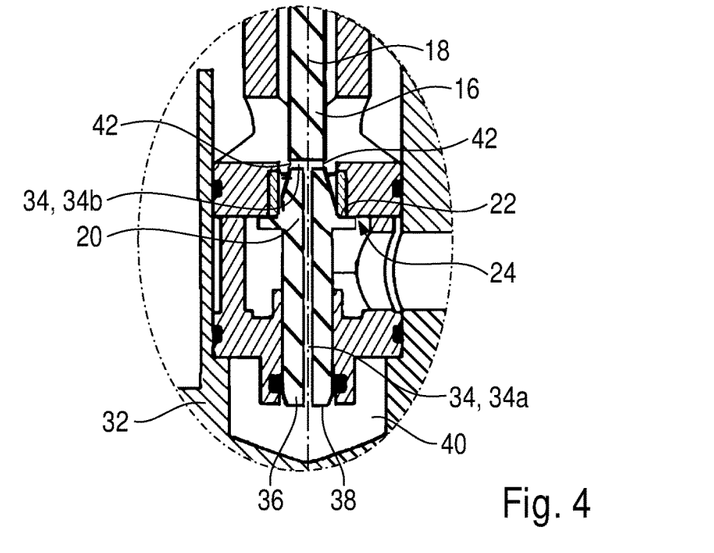

In the second embodiment of the closed-loop control valve module 10 represented in FIGS. 3 and 4, the pressure compensation channel 34 runs in the valve spindle 16.

The pressure compensation channel 34 has a pressure compensation channel section 34a running substantially along the valve spindle axis 18 and a pressure compensation channel section 34b running substantially transverse to the valve spindle axis 18.

The pressure compensation channel section 34b running transverse to the valve spindle axis 18 fully traverses the valve spindle 16.

Furthermore, the pressure compensation channel sections 34a, 34b are arranged in the valve spindle 16 such that, in a closed state of the closed-loop control valve module 10, a mouth 42 of the pressure compensation channel 34 on the fluid inlet side is arranged on a fluid inlet side of the valve seat 22.

In the embodiment represented in FIG. 4, the mouth 42 is formed by the two opposite ends of the pressure compensation channel section 34b running transverse to the valve spindle axis 18.

Furthermore, the mouth 42 on the fluid inlet side is arranged adjacent to the sealing section 20.

Thus in the second embodiment also, the pressure compensation channel 34 connects the end 36 of the valve spindle 16 opposite the valve actuator motor 12 to the fluid inlet 26 in terms of flow.

For the further features and properties of the second embodiment, reference is made to the explanation of the first embodiment.

Figure 5:
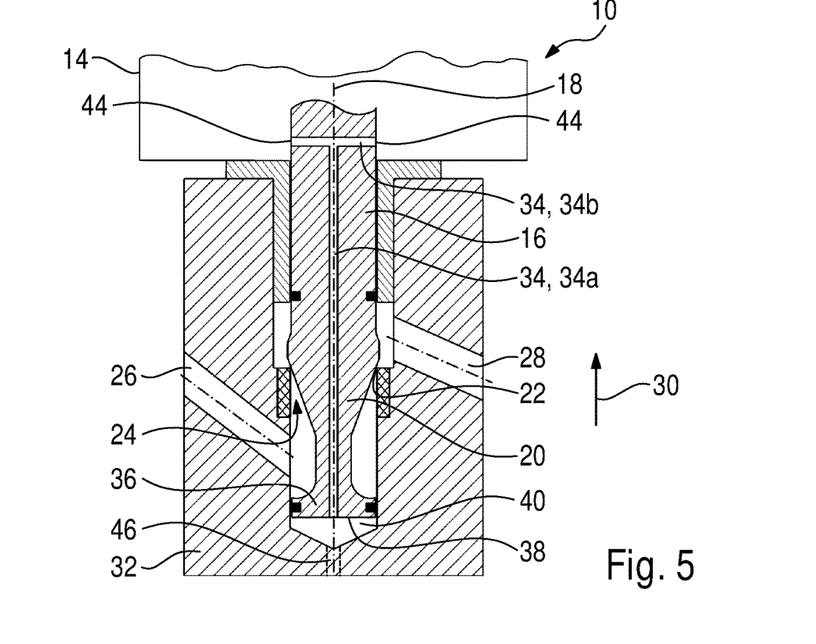
Figure 6:
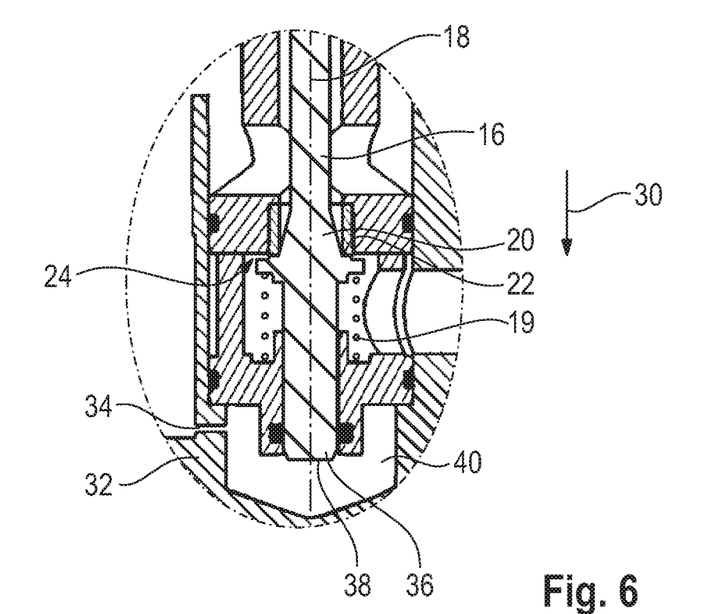
FIG. 6 corresponds to FIG. 2 but shows the valve spindle in a closed position.
Figure 7:
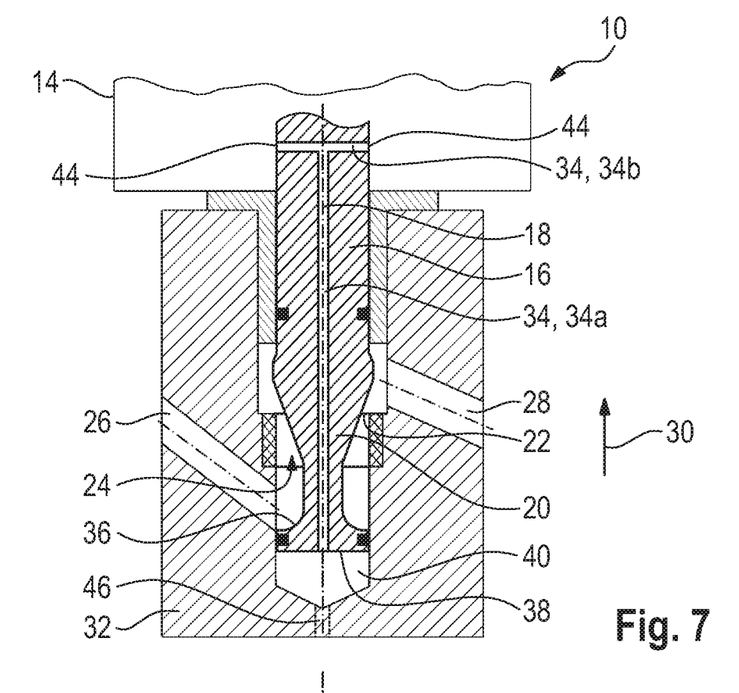
FIG. 7 corresponds to FIG. 5 but shows the valve spindle in an open position.

A third embodiment of the closed-loop control valve module 10 is shown in FIG. 5.

Unlike the above-named embodiments, the valve spindle 16 is now connected to the valve actuator motor 12, not represented in more detail in FIG. 5, such that it moves towards the valve actuator motor 12 in the direction of the open state of the closed-loop control valve module 10.

The pressure compensation channel 34, which runs in the valve spindle 16, now connects the end 36 of the valve spindle 16 opposite the valve actuator motor 12 to a pressure compensation area which is formed in the third embodiment by an interior of the valve actuator housing 14.

In a closed state of the closed-loop control valve module 10, a mouth 44 of the pressure compensation channel 34 opening into the pressure compensation area is arranged inside the valve actuator housing 14.

The mouth 44 is again formed by the two opposite ends of the pressure compensation channel section 34b.

In an additional variant, starting from the embodiment represented in FIG. 5, the pressure compensation channel 34 can be supplemented or replaced by an exhaust channel 46.

The remaining properties and features of the third embodiment follow from the explanations above, to which reference is made.

In all embodiments, the aim of the pressure compensation effected by means of the pressure compensation channel 34 is to keep the valve spindle 16 free from a resulting force oriented along the valve spindle axis 18.

In other words, no resulting force is to act on the valve spindle 16 along the valve spindle axis 18, at least in the closed state of the closed-loop control valve module 10.

In such a state, only a comparatively small drive force has to be exerted by means of the valve actuator motor 12 in order to move the valve spindle 16.

In order to achieve this, all surface areas of the valve spindle 16 oriented in the axial direction along the valve spindle axis 18 which are in fluid connection with the pressure compensation area and point in the direction of the valve actuator motor 12 correspond cumulatively to 75% to 125% of the cumulative surface areas of the valve spindle 16 oriented in the axial direction which are likewise in fluid connection with the pressure compensation area and point in a direction contrary to the valve actuator motor 12.

As already explained, in the embodiment according to FIG. 5 the pressure compensation area is formed by the interior of the valve actuator housing 14.

Once the pressure prevailing in the pressure compensation area is substantially constant, a zero-force state can thus be achieved in that the surface areas oriented in different axial directions are matched to each other.

In the case of surfaces running at an incline, only the surface area projected into an axial plane is to be taken into consideration in this connection.

A valve spindle 16 which is almost fully pressure-compensated results. Thus, if fluid pressure is applied, almost no resulting force is experienced by it along the valve spindle axis 18.

The same applies when the pressure compensation channel connects the end 36 opposite the valve actuator motor 12 to the fluid inlet 26 in terms of flow.

Then, in a closed state of the closed-loop control valve module 10, all surface areas of the valve spindle 16 oriented in the axial direction along the valve spindle axis 18 which are in fluid connection with the fluid inlet 26 and point in the direction of the valve actuator motor 12 correspond cumulatively to 75% to 125% of the cumulative surface areas of the valve spindle 16 oriented in the axial direction along the valve spindle axis 18 which are in connection with the fluid inlet 26 and point in a direction contrary to the valve actuator motor 12.

Here also, in the case of surfaces running at an incline, only the surface areas projected into an axial plane are to be taken into consideration.

Thus also in the case of a pressure compensation channel 34 connected to the fluid inlet 26, a valve spindle 16 which is almost fully pressure-compensated results. Thus it experiences almost no resulting force along the valve spindle axis 18.

In addition, the closed-loop control valve modules 10 according to the embodiments from FIGS. 1 and 5 are also pressure-compensated relative to the fluid outlet 28.

Thus in a closed state of the closed-loop control valve modules 10, all surface areas of the valve spindle 16 oriented in the axial direction which are in fluid connection with the fluid outlet 28 and point in the direction of the valve actuator motor 12 correspond cumulatively to 75% to 125% of the cumulative surface areas of the valve spindle 16 oriented in the axial direction which are in fluid connection with the fluid outlet 28 and point in a direction contrary to the valve actuator motor 12.

Consequently, starting from any back pressure applied at the fluid outlet 28, no or only a comparatively small resulting force acts on the valve spindle 16.

The invention claimed is:

1. A closed-loop control valve module for closed-loop controlling a fluid flow, with an electrical valve actuator motor, wherein a valve spindle comprising a frustoconical sealing section is displaceable by means of the valve actuator motor along a valve spindle axis and the frustoconical sealing section, depending on the position of the valve spindle, releases or separates off a flow channel connecting a fluid inlet and a fluid outlet, wherein a pressure compensation channel is provided which, at least in the closed state of the closed-loop control valve module, connects an end of the valve spindle opposite the valve actuator motor to the fluid inlet in terms of flow, wherein at least a section of the pressure compensation channel is separate from the flow channel.

2. The closed-loop control valve module according to claim 1, characterized in that a fluid flow direction oriented from the fluid inlet to the fluid outlet at least in an area of a valve seat is oriented in the same direction as a widening direction of the frustoconical sealing section.

3. The closed-loop control valve module according to claim 2, characterized in that the frustoconical sealing section and the valve seat interact in a radially sealing manner.

4. The closed-loop control valve module according to claim 1, characterized in that the frustoconical sealing section and a valve seat interact in a radially sealing manner.

5. The closed-loop control valve module according to claim 1, characterized in that the end of the valve spindle opposite the valve actuator motor, delimits a cavity provided in a closed-loop control valve housing and the pressure compensation channel connects the cavity to the pressure compensation area or the fluid inlet in terms of flow.

6. The closed-loop control valve module according to claim 5, characterized in that the pressure compensation channel runs in the closed-loop control valve housing.

7. The closed-loop control valve module according to claim 5, characterized in that the pressure compensation channel runs in the valve spindle.

8. The closed-loop control valve module according to claim 6, characterized in that the pressure compensation channel runs in the valve spindle.

9. The closed-loop control valve module according to claim 8, characterized in that the pressure compensation channel comprises a pressure compensation channel section running substantially along the valve spindle axis and a pressure compensation channel section running substantially transverse to the valve spindle axis.

10. The closed-loop control valve module according to claim 9, wherein the pressure compensation channel section running transverse to the valve spindle axis fully traverses the valve spindle.

11. The closed-loop control valve module according to claim 9, characterized in that, in a closed state of the closed-loop control valve module, a mouth of the pressure compensation channel on the fluid inlet side is arranged on a fluid inlet side of the valve seat.

12. The closed-loop control valve module according to claim 11, wherein the mouth of the pressure compensation channel on the fluid inlet side is arranged adjacent to the sealing section.

13. The closed-loop control valve module according to claim 9, characterized in that in a closed state of the closed-loop control valve module a mouth of the pressure compensation channel on the pressure compensation area side is arranged inside a valve actuator housing.

14. The closed-loop control valve module according to claim 1, characterized in that the valve actuator motor can be operated in two directions.

15. The closed-loop control valve module according to claim 14, wherein the valve spindle is not spring-loaded.

16. The closed-loop control valve module according to claim 1, characterized in that the valve actuator motor is self-locking.

17. The closed-loop control valve module according to claim 1, characterized in that in a closed state of the closed-loop control valve module all surface areas of the valve spindle oriented in the axial direction which are in fluid connection with the pressure compensation area and point in the direction of the valve actuator motor correspond cumulatively to 75% to 125% of the cumulative surface areas of the valve spindle oriented in the axial direction which are in fluid connection with the pressure compensation area and point in a direction contrary to the valve actuator motor.

18. The closed-loop control valve module according to claim 1, characterized in that in a closed state of the closed-loop control valve module all surface areas of the valve spindle oriented in the axial direction which are in fluid connection with the fluid inlet and point in the direction of the valve actuator motor correspond cumulatively to 75% to 125% of the cumulative surface areas of the valve spindle oriented in the axial direction which are in fluid connection with the fluid inlet and point in a direction contrary to the valve actuator motor.

19. The closed-loop control valve module according to claim 1, characterized in that in a closed state of the closed-loop control valve module all surface areas of the valve spindle oriented in the axial direction which are in fluid connection with the fluid outlet and point in the direction of the valve actuator motor correspond cumulatively to 75% to 125% of the cumulative surface areas of the valve spindle oriented in the axial direction which are in fluid connection with the fluid outlet and point in a direction contrary to the valve actuator motor.

20. A closed-loop control valve module for closed-loop controlling a fluid flow, with an electrical valve actuator motor, wherein a valve spindle comprising a frustoconical sealing section is displaceable by means of the valve actuator motor along a valve spindle axis and the frustoconical sealing section, depending on the position of the valve spindle, releases or separates off a flow channel connecting a fluid inlet and a fluid outlet,
- wherein a pressure compensation channel is provided which, at least in the closed state of the closed-loop control valve module, connects an end of the valve spindle opposite the valve actuator motor to a pressure compensation area in terms of flow,
- wherein the pressure compensation area is an interior space of a valve drive housing.

* * * * *